US012044575B2

(12) United States Patent
Ekkel et al.

(10) Patent No.: US 12,044,575 B2
(45) Date of Patent: Jul. 23, 2024

(54) SENSOR DEVICE (71) Applicant: SIGNIFY HOLDING B.V., Eindhoven (NL)

(72) Inventors: Jan Ekkel, Oss (NL); Harry Broers, 'S-Hertogenbosch (NL); Abhishek Murthy, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 115 days.

(21) Appl. No.: 17/916,611

(22) PCT Filed: Mar. 29, 2021

(86) PCT No.: PCT/EP2021/058067
§ 371 (c)(1),
(2) Date: Oct. 3, 2022

(87) PCT Pub. No.: WO2021/198127
PCT Pub. Date: Oct. 7, 2021

(65) Prior Publication Data
US 2023/0152157 A1  May 18, 2023

Related U.S. Application Data (60) Provisional application No. 63/003,920, filed on Apr. 2, 2020.

(30) Foreign Application Priority Data

Apr. 20, 2020 (EP) .................................. 20170282

(51) Int. Cl.
G01J 5/00 (2022.01)
G01J 5/12 (2006.01)
(Continued)

(52) U.S. Cl.
CPC ............... G01J 5/0025 (2013.01); G01J 5/12 (2013.01); G01P 13/00 (2013.01); H05B 47/115 (2020.01)

(58) Field of Classification Search
CPC ... G01J 5/0025; G01J 5/12; G01J 5/07; G01P 13/00; H05B 47/115; G08B 13/19695; G08B 13/19; Y02B 20/40
(Continued)

(56) References Cited

U.S. PATENT DOCUMENTS 8,963,088 B2  2/2015  Barlow et al.
9,217,672 B2  12/2015  Schilz et al.
(Continued)

FOREIGN PATENT DOCUMENTS

JP   H0933215 A    2/1997
JP   2014202614 A  10/2014
JP   5618311 B2   11/2014

OTHER PUBLICATIONS

Xipeng, Zhang, "Detection of Human by Thermopile Infrared Sensors," Creative Commons, http://hdl.handle.net/2297/45406, Mar. 2016 (131 Pages).
(Continued)

Primary Examiner — Ryan Jager (57) ABSTRACT

The present invention is related to an application of a Single Pixel Thermopile (SPT). The invention provides a sensor device comprising a Single Pixel Thermopile and a controller, wherein the Single Pixel Thermopile is configured to monitor a detection region and to measure over time a temperature signal of said detection region; wherein the detection region is bounded by a surface and the Single Pixel Thermopile is oriented at an angle of at least 20 degrees normal to the surface; wherein a projection of the detection region onto the surface renders an elongated detection area with a length axis and a width axis; wherein the controller
(Continued)

is configured to: obtain the temperature signal of the detection region; determine a movement characteristic of a person moving across said surface by detecting a pattern in the temperature signal of the detection region; output an output signal configured to control an electrical device upon determining the movement characteristic.

14 Claims, 3 Drawing Sheets

(51) Int. Cl.
*G01P 13/00* (2006.01)
*H05B 47/115* (2020.01)

(58) Field of Classification Search
USPC .......................................................... 315/297
See application file for complete search history.

(56) References Cited

U.S. PATENT DOCUMENTS

| 10,136,502 | B2* | 11/2018 | Broers | G06V 20/52 |
| 2014/0326888 | A1* | 11/2014 | Barlow | G01J 5/0025 |
| | | | | 250/342 |
| 2015/0185859 | A1* | 7/2015 | Yamamoto | G06F 3/011 |
| | | | | 345/156 |
| 2015/0338277 | A1* | 11/2015 | Schilz | G01P 13/00 |
| | | | | 250/342 |
| 2016/0338175 | A1* | 11/2016 | Broers | G01J 5/12 |
| 2017/0097264 | A1* | 4/2017 | Tonami | G01J 5/025 |
| 2022/0191984 | A1* | 6/2022 | Feil | H05B 45/28 |
| 2023/0152157 | A1* | 5/2023 | Ekkel | G01J 5/0025 |
| | | | | 315/297 |

OTHER PUBLICATIONS

"Infrared Gesture Sensing," Silicon Labs, 2015 (9 Pages).

* cited by examiner

SENSOR DEVICE

CROSS-REFERENCE TO PRIOR APPLICATIONS

This application is the U.S. National Phase application under 35 U.S.C. § 371 of International Application No. PCT/EP2021/058067, filed on Mar. 29, 2021, which claims the benefit of U.S. Provisional Application No. 63/003,920, filed on Apr. 2, 2020 and European Patent Application No. 20170282.6, filed on Apr. 20, 2020. These applications are hereby incorporated by reference herein.

FIELD OF THE INVENTION

The invention relates to a sensor device comprising a Single Pixel Thermopile and a controller. The invention further relates to a system comprising the sensor device and at least one electrical device. The invention also relates to a lighting system comprising the sensor device and at least one lighting device. The invention also relates to a luminaire comprising a housing, a light source, and the sensor device. The invention further relates to a method of determining a movement characteristic of a person moving across a surface, and to a corresponding computer program product.

BACKGROUND OF THE INVENTION

The built environment becomes more and more equipped with sensing solutions which may be utilized to control various actuators. For example, offices are often equipped with presence sensors to determine the presence of people in the office, so as to e.g. control lighting, blinds and/or HVAC. Cameras, Passive Infrared Sensors (PIR), or thermopile arrays are often used for such presence detection, and may even further be used for activity detection in more elaborate solutions. However, such sensors may be expensive, privacy sensitive, and too elaborate in operation. Hence, there is a clear need for privacy preserving, more straightforward, and inexpensive sensing solutions within the built environment, so as to control various electrical devices therein.

SUMMARY OF THE INVENTION

The present invention is related to an application of a Single Pixel Thermopile (SPT). A Single Pixel Thermopile (SPT) converts thermal energy into electrical energy. As the measurements of the SPT are limited to a single pixel, the SPT does not provide a spatial resolution, and can only measure a single temperature value within its respective detection region (or: field of view) over time. Because the SPT is relatively inexpensive, the SPT may still be advantageous to some limited application areas. For example: An ear-thermometer is a well-known example of a general SPT application. Another example may relate to presence detection with a Single Pixel Thermopile (SPT), wherein a triggering SPT is indicative for the general presence of a person.

Even though the application of a Single Pixel Thermopile (SPT) may be highly attractive due to costs, the limited (spatial) capabilities of the Single Pixel Thermopile (SPT) have made it disadvantageous for a wider application in the built environment.

Therefore, it is an object of the invention to provide an improved sensor device for controlling an electrical device, preferably a lighting device, which at least alleviates the problems and disadvantages mentioned above. Thereto, the invention provides a sensor device comprising a Single Pixel Thermopile adapted to be oriented relative to a surface and a controller, wherein the Single Pixel Thermopile is configured to monitor a detection region and to measure over time a temperature signal of said detection region; wherein the detection region is bounded by the surface and the Single Pixel Thermopile is oriented at an angle of at least 20 degrees normal to the surface; wherein a projection of the detection region onto the surface renders an elongated detection area with a length axis and a width axis; wherein the controller is configured to: obtain the temperature signal of the detection region; detect an asymmetric pattern in the temperature signal of the detection region; determine a movement direction of a person moving across said surface by detecting the asymmetric pattern in the temperature signal of the detection region; wherein the asymmetric pattern comprises an initial slope leading towards a peak and a subsequent slope leading away from the peak, wherein the initial slope and the subsequent slope are asymmetric; output an output signal configured to control an electrical device upon determining the movement direction.

The single pixel thermopile according to the invention may be adapted to be oriented relative to the surface in operation, and the controller may be configured to perform the abovementioned steps in operation.

In examples, the sensor device according to the invention may comprise a housing surface arranged for mounting the sensor device onto a mounting surface, wherein the Single Pixel Thermopile may be oriented at an angle of at least 20 degrees normal to said mounting surface. Hence, the Single Pixel Thermopile may be oriented at a specific tilt angle within the sensor device itself, and relative to a housing surface of the sensor device. Hence, when mounting the sensor device to said mounting surface, by the very construction of the sensor device itself and the placement of its structural components, the SPT may not be oriented perpendicular to said mounting surface, but always at a certain angle or tilt relative thereto.

The sensor device according to the invention comprises a Single Pixel Thermopile (SPT) and a controller. The SPT and the controller are operatively coupled, or phrased differently, are in communication and interaction with each other. The Single Pixel Thermopile (SPT) monitors (in operation) a detection region. The detection region may correspond to the single pixel resolution of the SPT. The detection region may alternatively be phrased as a detection volume, or Field-of-View, or detection area.

Therefore, the Single Pixel Thermopile (SPT) measures over time the temperature signal of said detection region. The temperature signal may comprise the (transient) temperature (response) of the (complete) detection region. The temperature signal may, in examples, be phrased differently as a heat signal.

Furthermore, the detection region of the Single Pixel Thermopile (SPT) is bounded by a surface. The Single Pixel Thermopile is oriented (or: tilted) at an angle of at least 20 degrees normal to said surface. A projection of the detection region onto the surface may consequently render an elongated detection area with a length axis and a width axis.

As a result of the above orientation (or: tilt), the Single Pixel Thermopile may render a non-homogenous temperature signal (or: sensor response). Hence, despite the single-pixel resolution of the Single Pixel Thermopile, a person may render a different and/or characteristic pattern in the temperature signal when being (or: moving) at different locations within the detection region. Therefore, the sensor device according to the invention may determine various movement characteristics of a person moving across said surface, such as movement direction, movement location, and/or movement speed.

Namely, the controller may obtain the temperature signal of the detection region. The controller is thereby configured to determine a movement characteristic of a person moving across said surface by detecting a pattern in the temperature signal of the detection region. Upon determining said movement characteristic, the controller is configured to output an output signal configured to control an electrical device. The electrical device may for example be associated with the detection region.

Hence, the present invention provides a sensor device for controlling an electrical device upon determining a movement characteristic of a person moving across said surface. This provides a clear advantage, and provides novel features over prior applications of sensor devices with a Single Pixel Thermopile. The possible applications of a SPT are thereby extended with such a sensor device. The sensor device is furthermore cost-effective.

Throughout the application, the person may be rephrased as an object or an animal, since the Single Pixel Thermopile and associated controller may also be suitable for detecting an object or an animal moving across said surface.

The surface may be a planar surface. The surface may for example be a floor, or a wall. The mounting surface may be a planar surface. The mounting surface may for example be a ceiling. The elongated detection area may for example be rectangular or elliptical of shape. The output signal may alternatively be a notification signal. In examples, the output signal may comprise an instruction, a code, or a command for controlling the electrical device. In aspects, the controller may be configured to control the electrical device.

In embodiment, the controller may be configured to output the output signal, wherein the output signal is configured to control the electrical device based on the movement characteristic, e.g. the movement direction, movement location and/or movement speed.

As mentioned, the movement characteristic may be a movement direction; and wherein the pattern may be an asymmetric pattern. Due to the Single Pixel Thermopile being oriented (or: tilted) at an angle normal to the surface, an asymmetric pattern in the temperature signal of the detection region may be indicative of a movement direction of a person moving across said surface, because the detection area is biased in a particular direction due to the tilt angle.

As mentioned, the asymmetric pattern comprises an initial slope leading towards a peak and a subsequent slope leading away from the peak, wherein the initial slope and the subsequent slope are asymmetric. Said initial slope and said subsequent slope may be defined respectively as an average initial slope and an average subsequent slope. Thus, the slope may be considered smooth irrespective of noise being on the temperature signal.

Moreover, in a further embodiment thereof, the controller may be configured to: determine the person moving in a first movement direction (substantially) along said length axis if the initial slope is steeper than the subsequent slope, the first movement direction being the direction towards the side to which the Single Pixel Thermopile is oriented. For example, the second movement direction may be 'right' relative to a fixed origin.

Moreover, in a further embodiment thereof, the controller is configured to: determine the person moving in a second movement direction (substantially) along said length axis if the subsequent slope is steeper than the initial slope, the second movement direction being the direction towards the side to which the Single Pixel Thermopile is not oriented. For example, the second movement direction may be 'left' relative to the above fixed origin.

In a further embodiment, the controller may be configured to: determine a speed of the person moving across said surface based on (at least partly) a time period between the initial slope and the subsequent slope. Since the initial slope and the subsequent slope are indicative of the person moving across said elongated detection area, the controller knowing beforehand the dimensions of the elongated detection area (e.g. by stored, installed, or commissioned parameters), the speed of the person moving across said surface may be determined on (at least partly) a time period between the initial slope and the subsequent slope.

Moreover, in an embodiment, the controller is configured to obtain a location of the sensor device or the Single Pixel Thermopile relative to the surface. The location may for example be an installation location, or a mounting height, or a ceiling height to which the sensor device is mounted. In aspects, the controller may retrieve said location from a further device, such as a (location) server, or receive said location from a further device, such as a user input device.

More specifically, in an embodiment, the movement characteristic may alternatively or additionally be a movement location of the person moving across said surface along the width axis, the movement location being at a distance relative to the Single Pixel Thermopile; wherein the controller is configured to: determine the movement location based on a time duration of a peak or a plateau in the temperature signal. Thereby, the controller may be configured to output the output signal configured to control the electrical device upon determining the movement direction and the movement location. In a further embodiment, the controller may be configured to: determine the movement location by comparing the time duration of said peak or said plateau in the temperature signal with a predefined time duration. Such embodiments may be advantageous, because along the width axis the detection area may increase with increasing distance (e.g. consider the detection region to be a volumetric cone with the tip at the center of the Single Pixel Thermopile). Thus, by assessing the time duration of a positive detection, which may manifest by a peak or plateau in the temperature signal, the location at which the person traverses the detection region along the width axis may be determined.

In an embodiment, the Single Pixel Thermopile may be oriented at an angle between 30 and 70 degrees normal to the surface, preferably between 30 and 60 degrees normal to the surface. For example, in an embodiment, the Single Pixel Thermopile may be oriented at an angle of substantially 45 degrees normal to the surface. Said angle may e.g. be between 40 degrees and 50 degrees normal to the surface.

In an embodiment, the output signal may be configured to control the electrical device to turn on. Alternatively, in an embodiment, the output signal may be configured to control the electrical device to turn off. In aspects, the output signal may comprise an instruction to control the electrical device to a device parameter. Said device parameter may for example be (operation) mode, (sensor) sensitivity, intensity, etc.

The present invention may particularly be suited for lighting control. Hence, in an embodiment, the electrical device may be at least one lighting device, and wherein the output signal may be configured to control a lighting property of said at least one lighting device; wherein the lighting property may be at least one of: an intensity, a color, a color temperature, a modulation, a directionality, a light recipe and/or a light scene. The lighting device may for example be a luminaire, a spotlight, a pixilated spotlight, a fluorescent tube, a projector, a flood light, and/or a bridge For example, in an embodiment, the output signal is configured to control the at least one lighting device to provide a task lighting recipe. The lighting device may for example be a luminaire, a spotlight, a pixilated spotlight, a fluorescent tube, a projector, a flood light, and/or a bridge.

For example, in an embodiment, the output signal is configured to control a plurality of lighting devices to turn on or off according to a set timetable. For example, the output signal may be configured to control said plurality of lighting devices to turn on or off sequentially. This may provide a follow-me lighting feature, as the control signal is provided upon determining the movement characteristic of the person moving across said surface, such as the movement direction. All lighting devices of the plurality of lighting devices in the direction of the movement direction may therefore be turned off, while the other lighting devices of the plurality of lighting devices may be turned off.

In an embodiment, the electrical device may be one of: an actuator, a sensor, a sensor bundle, a speaker, a HVAC system, an electrical door, a heater, a watering system, a fan, a fodder machine, a security system, a scent diffuser, and/or a window blind. The electrical device may alternatively be one of: a computer, a laptop, a (smart) portable device, a smartphone, a wearable device, a display and/or a smart table. The electrical device may alternatively be a smart fitting room, a selfie-booth, or a smart toilet.

In an embodiment, the electrical device may be a blocking device, wherein the output signal is configured to control the blocking device to open or close. In examples, the blocking device may be one of: a door, a gate, a window, a vault, or a tourniquet.

In an embodiment, the electrical device may be a position engine, wherein the output signal is configured to control the position engine to store the movement characteristic in a memory.

In further examples, the controller may be arranged to count a number of persons each having a similar movement direction towards a first direction. The controller may also be arranged to subtract a number of persons each having a different movement direction from said number of persons each having a similar movement direction towards a first direction.

It is a further object of the invention to provide an improved (control) system, which at least alleviates the problems and disadvantages mentioned above. Thereto, the invention further provides a system comprising the sensor device according to the invention and at least one electrical device; wherein the output signal of the sensor device is configured to control the at least one electrical device upon determining the movement characteristic. In an embodiment, the system may be a lighting system and/or the at least one electrical device may be at least one lighting device. Hence, the invention provides a lighting system. The advantages and/or embodiments applying to the sensor device according to the invention may also apply mutatis mutandis to the system and lighting system according to the invention.

Alternatively, said at least one electrical device may for example be an actuator, a sensor, a sensor bundle, a speaker, a HVAC system, an electrical door, a heater, a watering system, a refrigerator, a fan, a feeding machine, a security system, a scent diffuser, and/or a window blind.

It is a further object of the invention to provide a luminaire, which at least alleviates the problems and disadvantages mentioned above. Thereto, the invention further provides a luminaire comprising a housing, a light source, and the sensor device according to the invention, wherein the light source and the sensor device are accommodated in the housing of the luminaire; wherein the output signal of the sensor device is configured to control the light source upon determining the movement characteristic. The advantages and/or embodiments applying to the sensor device according to the invention may also apply mutatis mutandis to the luminaire according to the invention.

In further examples, the controller may be arranged to obtain an identifier of said person, and the output signal may be configured to control said electrical device at least based on said identifier. Thus, in such example cases, the controller may be configured to obtain an identifier associated with the person, wherein the output signal may be configured to control the electrical device based on the obtained identifier. Such examples may be advantageous for controlling the electrical device also in accordance with the identity of the person. The person may also be an animal. The person and/or animal may thereby comprise a data tag comprising the identifier, so as to convey their respective identifier to the controller. The sensor device may therefore also comprise a receiver unit for receiving said identifier.

It is a further object of the invention to provide an improved method, which at least alleviates the problems and disadvantages mentioned above. Thereto, the invention further provides a method of determining a movement direction of a person moving across a surface, wherein the method is performed by a sensor device comprising a Single Pixel Thermopile adapted to be oriented relative to a surface and a controller, wherein the method comprises: the Single Pixel Thermopile monitoring a detection region and measuring over time a temperature signal of said detection area; wherein the detection region is bounded by the surface and the Single Pixel Thermopile is oriented at an angle of at least 20 degrees normal to the surface; wherein a projection of the detection region onto the surface renders an elongated detection area with a length axis and a width axis; the controller obtaining the temperature signal of the detection region; the controller detecting an asymmetric pattern in the temperature signal of the detection region; the controller determining a movement direction of the person moving across the surface by detecting the asymmetric pattern in the temperature signal of the detection region; wherein the asymmetric pattern comprises an initial slope leading towards a peak and a subsequent slope leading away from the peak, wherein the initial slope and the subsequent slope are asymmetric; the controller outputting an output signal configured to control an electrical device upon determining the movement characteristic. The advantages and/or embodiments applying to the sensor device according to the invention may also apply mutatis mutandis to the method according to the invention.

More specifically, as mentioned, the movement characteristic may be a movement direction; and wherein the pattern may be an asymmetric pattern. In an embodiment, the asymmetric pattern comprises an initial slope leading towards a peak and a subsequent slope leading away from the peak, wherein the initial slope and the subsequent slope are asymmetric.

Hence, in a further embodiment thereof, the method may comprise: the controller determining the person moving in a first movement direction along said length axis if the initial slope is steeper than the subsequent slope, the first movement direction being the direction towards the side to which the Single Pixel Thermopile is oriented.

Hence, in a further embodiment thereof, the method may comprise: the controller determining the person moving in a second movement direction along said length axis if the subsequent slope is steeper than the initial slope, the second movement direction being the direction towards the side to which the Single Pixel Thermopile is not oriented.

Hence, in an embodiment, additionally or alternatively, the method may comprise: the controller determining the movement location based on a time duration of a peak or a plateau in the temperature signal. In an embodiment thereof, the method may comprise: the controller determining the movement location by comparing the time duration of said peak or said plateau in the temperature signal with a predefined time duration.

Hence, in a further embodiment thereof, the method may comprise: the controller determining a speed of the person moving across said surface based on (at least partly) a time period between the initial slope and the subsequent slope, or based time duration of a peak or a plateau in the temperature signal.

The invention further relates to a computer program product. Hence, the invention provides a computer program product for a computing device, the computer program product comprising computer program code to perform a method according to the invention when the computer program product is run on a processing unit of the computing device.

Thus, aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

In other aspects, the invention may alternatively provide a sensor device comprising a controller and thermopile comprising at least one single pixel, wherein each single pixel of the at least one single pixel is configured to monitor a respective part of a detection region and to measure over time a respective temperature signal of said respective part of the detection region, wherein the detection region is bounded by a surface and the Single Pixel Thermopile is oriented at an angle of at least 20 degrees normal to the surface; wherein a projection of the detection region onto the surface renders an elongated detection area with a length axis and a width axis; wherein the controller is configured, for each single pixel of the at least one single pixel, to: obtain the respective temperature signal of the respective part of the detection region; determine a respective movement characteristic of a person moving across said surface by detecting a respective pattern in the respective temperature signal; output a respective output signal configured to control an electrical device upon determining the movement characteristic.

BRIEF DESCRIPTION OF THE DRAWINGS

The invention will now be further elucidated by means of the schematic non-limiting drawings.

DETAILED DESCRIPTION OF THE EMBODIMENTS

Figure 1A:
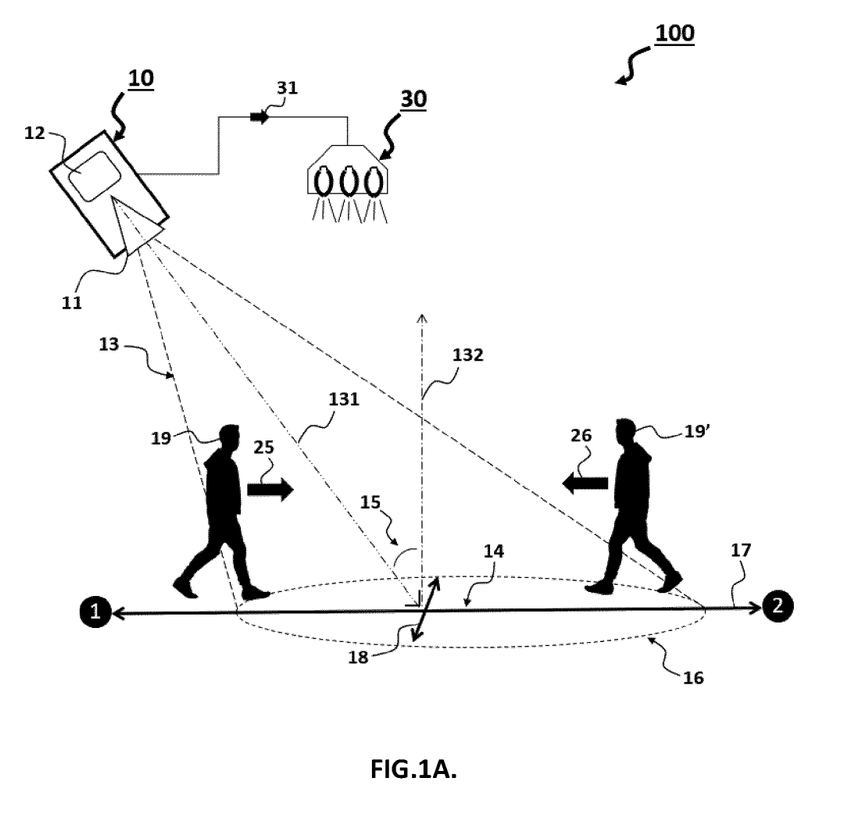
FIG. 1A depicts schematically an embodiment of a lighting system according to the invention, the lighting system comprising the sensor device and electrical device according to the invention, wherein the electrical device is a lighting device.

FIG. 1A depicts schematically, by non-limiting example, an embodiment of a lighting system 100 according to the invention. The lighting system 100 is installed in a space. The space is an office space, but may alternatively be a home space, a horticulture space, a livestock space, a retail space, an outdoor space, or an entertainment space. The lighting system 100 comprises a sensor device 10 and an electrical device 30. The sensor device 10 is mounted to a ceiling in said space. Here, the electrical device is a separate lighting device 30, but may alternatively be any other device mentioned above, such as e.g. a sensor, a bridge device, a portable user device, or an actuator. The lighting device may for example be a luminaire, a spotlight, a pixilated spotlight, a fluorescent tube, a projector, a flood light, a light switch, and/or a bridge. The lighting device may also be an array of lighting devices, or an array of light sources.

The sensor device 10 comprises a controller 12 and a Single Pixel Thermopile 11 (SPT). The controller 12 and the Single Pixel Thermopile 11 are operatively coupled and are accommodated within a same housing of the sensor device 10. Alternatively, the Single Pixel Thermopile (SPT) and the controller may be arranged separately. Yet alternatively, the electrical device may comprise the sensor device. For example, in case the electrical device is a luminaire, the sensor device may be part of a luminaire, or be part of a sensor-bundle that is pluggable to a luminaire. Thus, the invention may provide a luminaire comprising the sensor device.

The Single Pixel Thermopile 11 monitors a detection region 13. Here, the detection region 13 is a volumetric cone with a centerline 131. The detection region corresponds to the Field-of-View of the Single Pixel Thermopile 11. The top of said volumetric cone may be centered at the center (or: at the single pixel) of the Single Pixel Thermopile 11. The volumetric cone may thus be considered as the Field-of-View of the Single Pixel Thermopile 11; and the detection region 13 corresponds to the single pixel resolution of the Single Pixel Thermopile 11.

The detection region 13 is bounded by a surface 14 in said space. The surface 14 is a floor of said space. A person, an object, and/or an animal may move across said surface 14, e.g. by means of walking, riding or hovering over said floor. Referring to the embodiment depicted in FIG. 1A, a same person 19, 19' moves across said surface 14 in one direction and subsequently in an opposite direction.

The Single Pixel Thermopile 11 is oriented at an angle 15 of at least twenty degrees normal to the surface 14. Said angle 15 is the angle between the centerline 131 of the detection region 13 of Single Pixel Thermopile 11 and the normal vector 132 to the surface 14. Here, said angle 15 is thirty degrees, but may alternatively be an angle between e.g. 20 and 80 degrees.

As a result of the above orientation (or: tilt) of the Single Pixel Thermopile 11, a projection of the detection region 13 onto the surface 14 renders an elongated detection area 16. Since in the present embodiment the Single Pixel Thermopile renders a circular detection area (or: Field-of-View) (when normal to the surface), i.e. the volumetric cone, the elongated detection area 16 comprises an elliptical shape due to the tilt. The elongated detection area 16 comprises a length axis 17 and a width axis 18.

As partly mentioned before, the Single Pixel Thermopile 11 converts thermal energy of the detection region 13 into electrical energy. This renders a sensor signal, which is referred to as a temperature signal. Alternatively, the temperature signal may be phrased as a heat signal, or enthalpy signal. By its very nature and its single pixel resolution, the Single Pixel Thermopile 11 can only render a single temperature value associated with its detection region 13. However, in time, this may render a transient temperature signal.

Thus, the Single Pixel Thermopile 11 measures over time a temperature signal 20, 20' of the detection region 13. The temperature signal 20, 20' comprises the transient temperature response of the complete detection region 13 (or phrased differently as heat response of the detection region). The temperature signal 20, 20' is depicted, by non-limiting example, in FIGS. 1B and FIG. 1C respectively for the different movement directions of the person 19, 19'.

Because of the above orientation (or: tilt) of the Single Pixel Thermopile 11, the Single Pixel Thermopile 11 renders a non-homogenous temperature signal (or: sensor response) for detections in the space. Hence, said person 19, 19' may render a different and/or characteristic pattern in the temperature signal 20, 20' when moving differently within the detection region 13. Therefore, the sensor device 10 according to the invention may determine various movement characteristics of said person 19, 19' moving across said surface 14, such as e.g. movement direction, movement location, and/or movement speed; even though the measurement is performed with a Single Pixel Thermopile 11.

Figure 1B:
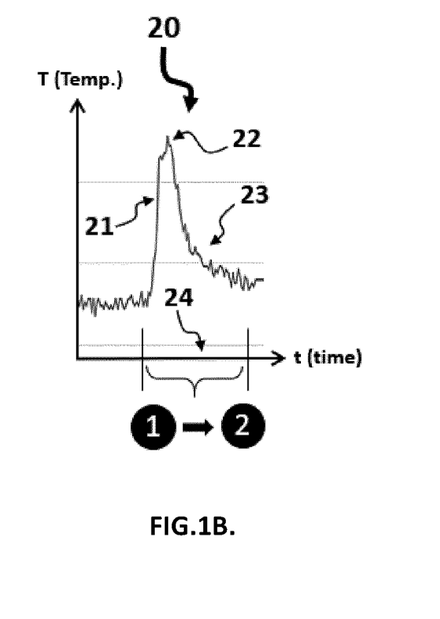
FIG. 1B depicts schematically a temperature signal corresponding to the embodiment depicted in FIG. 1A.
Figure 1C:
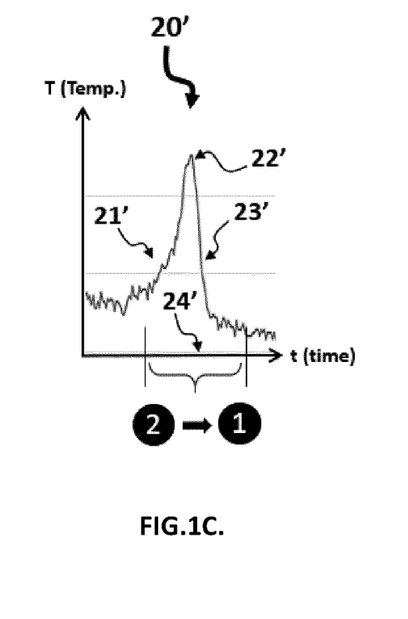
FIG. 1C depicts schematically a temperature signal corresponding to the embodiment depicted in FIG. 1A.

Still referring to FIG. 1A, but also referring to FIG. 1B and FIG. 1C, the controller 12 obtains the temperature signal 20, 20' of the detection region 13. The controller 12 is further configured to determine a movement characteristic of said person 19, 19' moving across said surface 14 by detecting a pattern in the temperature signal 20, 20' of the detection region 13. Here, the movement characteristic is movement direction 25, 26; and the pattern in the temperature signal 20, 20' is an asymmetric pattern.

More specifically, FIG. 1B depicts schematically, by non-limiting example, the temperature signal 20 corresponding to the embodiment depicted in FIG. 1A when the person 19 moves across the surface 14 in a first movement direction 25 along the length axis 17 of said elongated detection area 16. The asymmetric pattern therefore comprises an initial slope 21 (in time), which leads towards a peak 22. The asymmetric pattern also comprises a subsequent slope 23 (in time), which leads away from the peak 22. The initial slope 21 and the subsequent slope 23 are different, hence asymmetric. Phrased alternatively, the temperature signal 20 comprises an asymmetric peak.

Still referring to FIG. 1B, the initial slope 21 is steeper than the subsequent slope 23. Due to this particular pattern in the temperature signal 20, the controller 12 determines that the person 19 is moving in a first movement direction 25 along said length axis 17, the first movement direction 25 being the direction 2 to which the Single Pixel Thermopile 11 is oriented. Namely, the skewed orientation of the detection region 13, and corresponding biased angle-of-incidence of detection, enables to determine at which side the person 19 enters the detection region 13 and at which side the person 19 leaves the detection region; thereby providing an indication for the movement direction 25. In aspects: Said slopes may be average slopes, or the slopes corresponding to the envelope of the temperature signal 20.

More specifically, FIG. 1C depicts schematically, by non-limiting example, the temperature signal 20' corresponding to the embodiment depicted in FIG. 1A when the person 19' moves across the surface 14 in a second movement direction 26 along the length axis 17 of said elongated detection area 16. The asymmetric pattern therefore comprises an initial slope 21' (in time), which leads towards a peak 22'. The asymmetric pattern also comprises a subsequent slope 23' (in time), which leads away from the peak 22'. The initial slope 21' and the subsequent slope 23' are different, hence asymmetric. Phrased alternatively, the temperature signal 20' comprises an asymmetric peak.

Still referring to FIG. 1C, the subsequent slope 23' is steeper than the initial slope 21'. Due to this particular pattern in the temperature signal 20', the controller 12 determines that the person 19' is moving in a second movement direction 26 along said length axis 17, the second movement direction 25 being the direction 2 to which the Single Pixel Thermopile 11 is oriented. Namely, the skewed orientation of the detection region 13, and corresponding biased angle-of-incidence of detection, enables to determine at which side the person 19' enters the detection region 13 and at which side the person 19' leaves the detection region; thereby providing an indication for the movement direction 26. In aspects: Said slopes may be average slopes, or the slopes corresponding to the envelope of the temperature signal 20'.

Additionally, or alternatively, in an embodiment, the controller 12 determines the movement speed of the person 19, 19' based on the respective time period 24, 24' between the initial slope 21, 21' and the subsequent slope 23, 23'. Namely, the controller 12 may utilize prestored information about the installation location of the sensor device 10 relative to the surface 14 and the angle 15. This information may for example comprise installation location, installation coordinates, installation height, installation orientation or angle, space geometry, etc. The controller may retrieve or receive said information (or the installation location) from a further device, such as a (location) server or a user input device. Knowing the size of the detection region 13, and in particular the elongated detection area 16, the controller 12 may determine the (average) movement speed of the person 19, 19' with said (determined) time period 24, 24'.

Still referring to FIGS. 1A-C, upon determining said movement characteristic, which is the movement direction 25, 26 (and/or optionally the movement speed), the controller 12 outputs an output signal 31. The output signal 31 is arranged for controlling the lighting device 30.

Upon determining the person 19 moving in the first movement direction 25, the output signal 31 is configured to control the lighting device 30 to turn on, more specifically by gradually increasing light intensity to a (first) maximum level. Said increasing to a maximum level may optionally be proportional to the movement speed in the according embodiments. Here, the first movement direction 25 indicates the person 19 entering the space.

Upon determining the person 19 moving in the second movement direction 25, the output signal 31 is configured to control the lighting device 30 to turn off, more specifically by gradually decreasing light intensity to a (first) minimum level. Said decreasing to a minimum level may optionally be proportional to the movement speed in the according embodiments. Here, the second movement direction 26 indicates the person 19' leaving the space.

Alternatively, other lighting properties may be controlled upon detecting the movement direction and/or the movement speed, such as a color, a color temperature, a modulation, a directionality, a light recipe and/or a light scene. For example, the output signal may be configured to control the lighting device to provide a particular light scene, if the person comprises a movement direction in a particular direction. Another example, in alternative embodiments, the lighting device may be a plurality of light sources, which plurality of light sources may be arranged consecutively along the length axis in the first movement direction. Then, upon determining the person moving in the first movement direction, the output signal may be configured to control the plurality of light sources to turn on according to a predefined timetable, such that the light sources are turned on consecutively along the expected trajectory of the person. This may be a follow-me lighting. Other examples providing use cases in office, home, industry, outdoor, horticulture, livestock domains may similarly be envisioned. The person may alternatively be an object or an animal.

Hence, the present invention provides a lighting system, and in particular a sensor device 10 for controlling an electrical device 30 upon determining a movement characteristic of a person 19, 19' moving across said surface 14. Hence, the sensor device 10 advantageously provides additional features to the Single Pixel Thermopile 11 and the associated lighting device, which would otherwise not be present due to the single pixel resolution of the Single Pixel Thermopile 11.

Additionally, or alternatively, in an embodiment (not depicted) similar to the embodiment depicted in FIGS. 1A-C, but wherein the controller 12 determines a movement offset location parallel to the length axis 17 of the elongated detection area 16. Namely, the controller 12 is configured to determine a respective amplitude of the peak 22, 22' in the temperature signal 20, 20' by comparing the respective amplitude of the peak 22, 22' with a predefined amplitude value corresponding to said movement offset location parallel to the length axis 17. Hence, the sensor device may not only determine movement direction and/or speed of a person 19, 19' moving along said length axis 17, but also optionally the offset relative to the length axis 18 where the person is moving along the length axis 17.

Figure 2A:
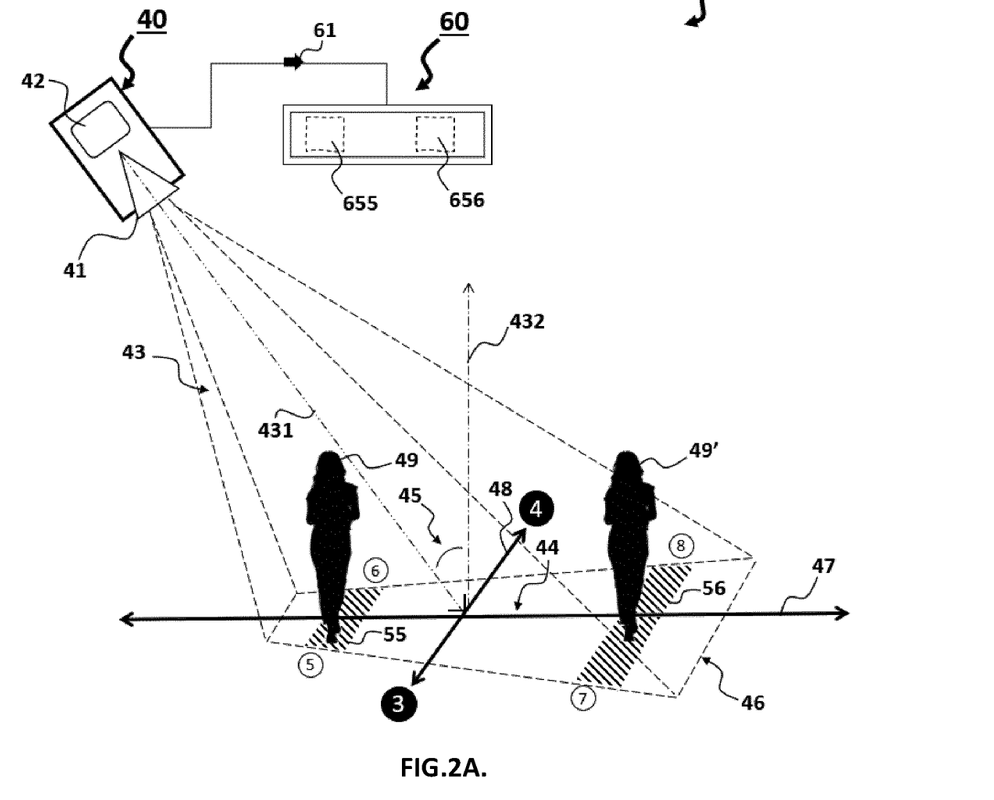
FIG. 2A depicts schematically an embodiment of a system according to the invention, the system comprising the sensor device and electrical device according to the invention, wherein the electrical device is a display.

FIG. 2A depicts schematically, by non-limiting example, an embodiment of a system 200 according to the invention. The system 200 is installed in a space. Here, the space is a retail environment. The system 200 comprises a sensor device 40 and an electrical device 60. Here, the electrical device 60 is a display. The display may be used for digital and/or interactive signage. The electrical device may alternatively be any other electrical device mentioned in the application, or similar.

The sensor device 40 is installed in said space. The sensor device 40 comprises a controller 42 and a Single Pixel Thermopile 41 (SPT). The controller 42 and the Single Pixel Thermopile 41 are operatively coupled and are accommodated within a same housing of the sensor device 40. Alternatively, the Single Pixel Thermopile (SPT) and the controller may be arranged separately. Yet alternatively, the electrical device may comprise the sensor device.

The Single Pixel Thermopile 41 monitors a detection region 43. Here, the detection region 43 is a volumetric cone with a centerline 431, and a square base. The detection region 43 corresponds to the Field-of-View of the Single Pixel Thermopile 41. The top of said volumetric cone may be centered at the center (or: at the single pixel) of the Single Pixel Thermopile 41. The volumetric cone may thus be considered as the Field-of-View of the Single Pixel Thermopile 41; and the detection region 43 corresponds to the single pixel resolution of the Single Pixel Thermopile 41.

The detection region 43 is bounded by a surface 44 in said space. A person, an object, and/or an animal may move across said surface 44, e.g. by means of walking, riding or hovering over said floor. Referring to the embodiment depicted in FIG. 2A, a same person 49, 49' moves across said surface 44 at various distances to the Single Pixel Thermopile 41 (and hence the sensor device 40).

The Single Pixel Thermopile 41 is oriented at an angle 45 of at least twenty degrees normal to the surface 44. Said angle 45 is the angle between the centerline 431 of the detection region 43 of Single Pixel Thermopile 41 and the normal vector 432 to the surface 44. Here, said angle 45 is forty-five degrees, but may alternatively be another angle between e.g. 20 and 80 degrees.

As a result of the above orientation (or: tilt) of the Single Pixel Thermopile 41, a projection of the detection region 43 onto the surface 44 renders an elongated detection area 46. Since in the present embodiment the Single Pixel Thermopile 41 renders a detection area (or: Field-of-View) with a square base, the elongated detection area 46 comprises a substantial trapezoidal shape. The elongated detection area 46 comprises a length axis 47 and a width axis 48. The length axis 47 spans the sides referenced with reference 1 and reference 2 in the FIG. 1A. The width axis 48 spans the sides referenced with reference 3 and reference 4 in the FIG. 1A. Alternatively, said Single Pixel Thermopile may render a circular detection region (or: Field-of-View) when positioned normal to the surface, which may render an elliptical projection on said surface when oriented under an angle normal to the surface.

As partly mentioned before, the Single Pixel Thermopile 41 converts thermal energy of the detection region 43 into electrical energy. This renders a sensor signal, which is referred to as a temperature signal. Alternatively, the temperature signal may be phrased as a heat signal, or enthalpy signal. By its very nature and its single pixel resolution, the Single Pixel Thermopile 41 can only render a single temperature value associated with its detection region 43. However, in time, this may render a transient temperature signal.

Thus, the Single Pixel Thermopile 41 measures over time a temperature signal 50, 50' of the detection region 43. The temperature signal 50, 50' comprises the transient temperature response of the complete detection region 43 (or phrased differently as heat response of the detection region). The temperature signal 50, 50' is depicted, by non-limiting example, in FIG. 2B and FIG. 2C respectively for the different movement directions of the person 49, 49'.

Because of the above orientation (or: tilt) of the Single Pixel Thermopile 41, the Single Pixel Thermopile 41 renders a non-homogenous temperature signal (or: sensor response) for detections in the space. Hence, said person 49, 49' may render a different and/or characteristic pattern in the temperature signal 50, 50' when moving differently within the detection region 43. Therefore, the sensor device 40 according to the invention may determine various movement characteristics of said person 49, 49' moving across said surface 44, such as e.g. movement direction, movement location, and/or movement speed; even though the measurement is performed with a Single Pixel Thermopile 41.

Figure 2B:
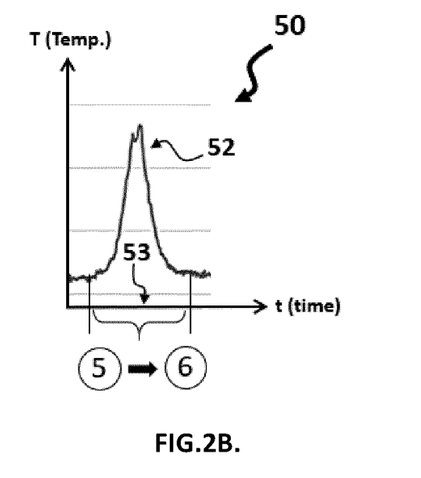
FIG. 2B depicts schematically a temperature signal corresponding to the embodiment depicted in FIG. 2A.
Figure 2C:
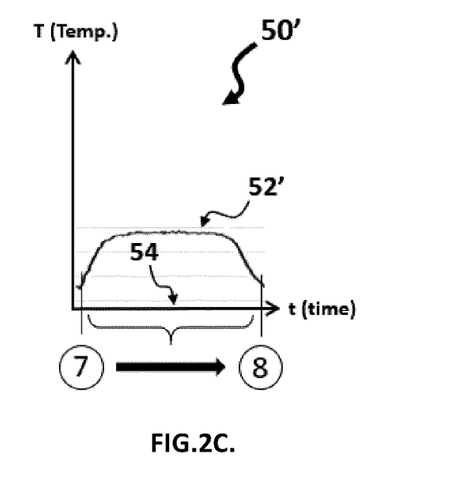
FIG. 2C depicts schematically a temperature signal corresponding to the embodiment depicted in FIG. 2A.

Still referring to FIG. 2A, but also referring to FIG. 2B and FIG. 2C, the controller 42 obtains the temperature signal 50, 50' of the detection region 43. The person 49, 49' is moving across said surface 44 along the width axis 48. Hence, the person 49, 49' is traversing the detection region 43 at different locations.

The controller 42 is configured to determine a movement characteristic of said person 49, 49' moving across said surface 44 by detecting a pattern in the temperature signal 50, 50' of the detection region 43. Here, the movement characteristic is movement location 55, 56 at a distance relative to the Single Pixel Thermopile 41.

More specifically, FIG. 2B depicts schematically, by non-limiting example, the temperature signal 50 corresponding to the embodiment depicted in FIG. 2A when the person 49 moves across the surface 44 along the width axis 48 of said elongated detection area 46 at a first location 55. The first location 55 is the path along the width axis 48 between reference 5 and reference 6 in the FIGS. 2A-C. The pattern therefore comprises a (plateau or) peak 52 in the temperature signal 50. The corresponding first time duration 53 of said pattern in the temperature signal 50 is indicative of the first movement location 55. Moreover, in examples, the controller determines the first movement location 55 by comparing the first time duration 53 with a predefined time duration (set for that respective location).

More specifically, FIG. 2C depicts schematically, by non-limiting example, the temperature signal 50' corresponding to the embodiment depicted in FIG. 2A when the person 49' moves across the surface 44 along the width axis 48 of said elongated detection area 46 at a second location 56. The second location 56 is the path along the width axis 48 between reference 7 and reference 8 in the FIGS. 2A-C. The pattern therefore comprises a (peak or) plateau 52' in the temperature signal 50'. The corresponding second time duration 54 of said pattern in the temperature signal 50' is indicative of the second movement location 56. Moreover, in examples, the controller determines the second movement location 55 by comparing the second time duration 54 with a predefined time duration (set for that respective location).

The second time duration 54 is longer than the first time duration 53 of the respective pattern in the temperature signal 50, 50' (i.e. said peak or plateau). Therefore, the sensor device 40, due to the determination of the controller 42, can differentiate between the first movement location 55 and the second movement location 56 of the person 49, 49' with a Single Pixel Thermopile. This is a feature that was previously unthinkable for a Single Pixel Thermopile, as it can only render a single spatial resolution of the whole detection region 43. Alternative to the present embodiment, a plurality of movement locations may mutatis mutandis be determined and distinguished by the sensor device according to the invention; for example three movement locations, or four movement locations within the detection region of the Single Pixel Thermopile may be determined.

Still referring to FIGS. 1A-C, upon determining said movement location of said person 49, 49', which is here either the first movement location 55 or the second movement location 56, the controller 42 outputs an output signal 61. The output signal 61 is arranged for controlling the electrical device 60.

Here, as mentioned, the electrical device 60 is a display in the retail space. The display 60 is arranged along the length axis 47 and spans at least partly along the length of the elongated detection area 46. The output signal 61 is arranged to control a first portion 655 of the display 60 upon determining the first movement location 55 of the person 49. The first portion 655 of the display 60 thereby corresponds to the first movement location 55. The person 49 may therefore walk towards the display by traversing the detection region 53, and the first portion 655 of the display 60 may be controlled in response thereto. Similarly: The output signal 61 is arranged to control a second portion 656 of the display 60 upon determining the second movement location 56 of the person 49'. The second portion 656 of the display thereby corresponds to the second movement location 56. The person 49' may therefore walk towards the display 60 by traversing the detection region 53, and the second portion 656 of the display 60 may be controlled in response thereto. In further examples, the controller may be arranged to obtain an identifier of said person, and the output signal may be configured to control said display at least based on said identifier. Moreover, the display may be a touch-enabled display, thus a user interface, which may for example allow for monetary transactions or to convey information. Thus, the electrical device may also be a check-out device.

Alternatively, the electrical device may be one of: an actuator, a sensor, a sensor bundle, a speaker, a HVAC system, an electrical door, a heater, a watering system, a fan, a fodder machine, a security system, a scent diffuser, a smart fitting room, a selfie-booth, a smart mirror, a smart toilet, and/or a window blind. The electrical device may alternatively be one of: a computer, a laptop, a (smart) portable device, a smartphone, a wearable device, a display and/or a smart table. Alternatively, the electrical device may be a blocking device, wherein the output signal is configured to control the blocking device to open or close. In examples, the blocking device may be one of: a door, a gate, a window, a vault, or a tourniquet. Alternatively, the electrical device may be a position engine, wherein the output signal is configured to control the position engine to store the movement characteristic in a memory.

For example, the space may be a bathroom space, and the electrical device may be a smart mirror, a door, a smart toilet, or a scent diffuser; such that upon detecting the movement location of a person moving towards said mentioned electrical devices may cause the controller to output the output signal for controlling said mentioned electrical devices, e.g. to turn on.

Alternatively, for example: The person may be an animal, such as a chicken. The electrical device may be a fodder device or watering device. Upon detecting the chicken at the first movement location, the controller outputs the output signal, wherein the output signal is configured to control the fodder device or watering device to provide fodder or water for the chicken at the first movement location. The same control concept may respectively apply for the second movement location.

Alternatively, for example: The electrical device may be a sensor, such as a camera. The controller of the sensor device may determine the person at the first movement location, and control the sensor (e.g. the camera) to image the first movement location. The controller may determine the person at the second movement location, and control the sensor (e.g. the camera) to image the second movement location.

Alternatively, for example: The electrical device may be a plurality of sensors arranged at a plurality of locations, such as an array of cameras arranged at a plurality of locations. The controller of the sensor device may determine the person at a particular location of the plurality of locations and control the respective sensor of the plurality of sensors (that is arranged at that particular location) to e.g. turn on. Other sensor properties may also be controlled, such as change of sensitivity, sampling rate, reporting rate, or application of filtering. Various combinations of sensors and/or other electrical devices may be envisioned accordingly.

Additionally, or alternatively, in an embodiment similar to the embodiment depicted in FIG. 2A-C, the controller 42 determines the movement speed of the person 49, 49' based on the respective time period 53, 54 of the pattern corresponding to the first and second movement location. Namely, the controller 42 may utilize prestored information about the installation location of the sensor device 40 relative to the surface 44 and the angle 45. This information may for example comprise installation location, installation coordinates, installation height, installation orientation or angle, space geometry, etc. The controller may retrieve or receive said information (or the installation location) from a further device, such as a (location) server or a user input device. Knowing the size of the detection region 43, and in particular the elongated detection area 46, the controller 42 may determine the (average) movement speed of the person 49, 49' with said (determined) time period 53, 54.

Figure 3:
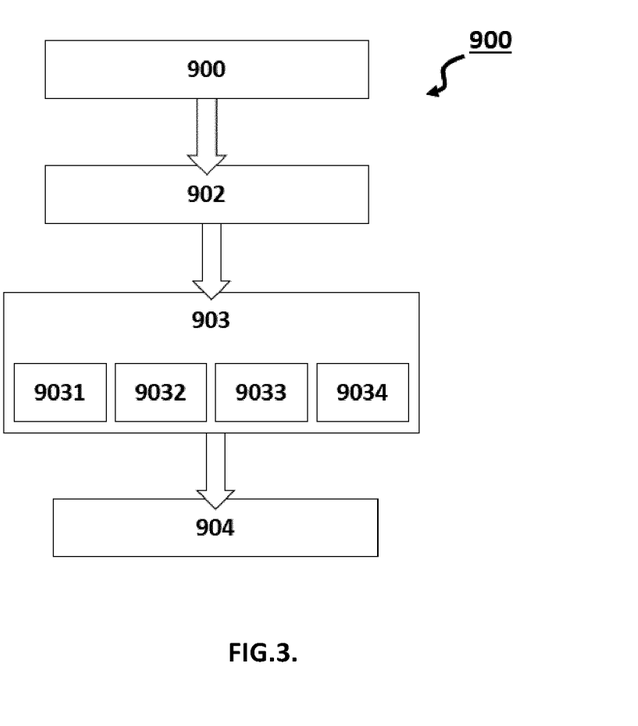
FIG. 3 depicts schematically an embodiment of a method according to the invention.

FIG. 3 depicts schematically, by non-limiting example, an embodiment of a method 900 according to the invention. The method is performed by the sensor device according to the invention, e.g. the sensor device of the embodiments depicted in FIG. 1A and FIG. 2A. The method 900 is thus performed by a sensor device comprising a Single Pixel Thermopile and a controller. The method comprises a first step 901 of the Single Pixel Thermopile monitoring a detection region and measuring over time a temperature signal of said detection area. The detection region is thereby bounded by a surface and the Single Pixel Thermopile is oriented at an angle of at least twenty degrees normal to the surface. For example: thirty degrees, forty five degrees, or between twenty and eighty degrees normal to the surface. Hence, a projection of the detection region onto the surface renders an elongated detection area with a length axis and a width axis. The method 900 further comprises a second step 902 of the controller obtaining the temperature signal of the detection region; and a third step 903 of the controller determining a movement characteristic of the person moving across the surface by detecting a pattern in the temperature signal of the detection region. The method 900 further comprises a step 904 of the controller outputting an output signal configured to control an electrical device upon determining the movement characteristic.

Since the movement characteristic may be movement direction, movement speed, and/or movement location, said step 903 of determining the movement characteristic of the person moving across the surface may comprise further particular steps.

The movement characteristic may be a movement direction. The pattern may then be an asymmetric pattern. The asymmetric pattern may comprise an initial slope leading towards a peak and a subsequent slope leading away from the peak, wherein the initial slope and the subsequent slope are asymmetric. The method 900 may therefore comprise a step 9031 of the controller determining the person moving in a first movement direction along said length axis if the initial slope is steeper than the subsequent slope, the first movement direction being the direction towards the side to which the Single Pixel Thermopile is oriented. Additionally, or alternatively, the method 900 may therefore comprise a step 9032 of the controller determining the person moving in a second movement direction along said length axis if the subsequent slope is steeper than the initial slope, the second movement direction being the direction towards the side to which the Single Pixel Thermopile is not oriented.

The movement characteristic may also be a movement location. That is: the movement location of the person moving across said surface along the width axis of the elongated detection area, wherein the movement location is being at a distance relative to the Single Pixel Thermopile. The method 900 may therefore comprise a step 9033 of the controller determining the movement location based on a time duration of a peak or a plateau in the temperature signal, for example by the sub step of comparing the time duration of said peak or said plateau in the temperature signal with a predefined time duration.

The movement characteristic may also be additionally or alternatively a movement speed. The method 900 may therefore comprise a step 9034 of the controller determining a speed of the person moving across said surface based on (at least partly) a time period between the initial slope and the subsequent slope; or based time duration of a peak or a plateau in the temperature signal.

The invention claimed is:

1. A sensor device comprising a Single Pixel Thermopile adapted to be oriented relative to a surface and a controller, wherein the Single Pixel Thermopile is configured to monitor a detection region and to measure over time a temperature signal of said detection region;
   wherein the detection region is bounded by the surface and the Single Pixel Thermopile is configured to be oriented at an angle of at least 20 degrees normal to the surface;
   wherein a projection of the detection region onto the surface renders an elongated detection area with a length axis and a width axis;
   wherein the controller is configured to:
      obtain the temperature signal of the detection region;
      detect an asymmetric pattern in the temperature signal of the detection region,
      determine a movement direction of a person moving across said surface by detecting the asymmetric pattern in the temperature signal of the detection region,
   wherein the asymmetric pattern comprises an initial slope leading towards a peak and a subsequent slope leading away from the peak, wherein the initial slope and the subsequent slope are asymmetric;
      output an output signal configured to control an electrical device upon determining the movement direction.

2. The sensor device according to claim 1, wherein the controller is configured to:
   determine the person moving in a first movement direction along said length axis if the initial slope is steeper than the subsequent slope, the first movement direction being the direction towards the side to which the Single Pixel Thermopile is oriented.

3. The sensor device according to claim 2, wherein the controller is configured to:
   determine a speed of the person moving across said surface based on a time period between the initial slope and the subsequent slope.

4. The sensor device according to claim 1, wherein the controller is configured to:

determine the person moving in a second movement direction along said length axis the subsequent slope is steeper than the initial slope, the second movement direction being the direction towards the side to which the Single Pixel Thermopile is not oriented.

5. The sensor device according to claim 1,
wherein the controller is configured to:
  determine a movement location of the person moving across said surface along the width axis based on a time duration of a peak or a plateau in the temperature signal, the movement location being at a distance relative to the Single Pixel Thermopile;
  output the output signal configured to control the electrical device upon determining the movement direction and the movement location.

6. The sensor device according to claim 5, wherein the controller is configured to:
  determine the movement location by comparing the time duration of said peak or said plateau in the temperature signal with a predefined time duration.

7. The sensor device according to claim 1, wherein the Single Pixel Thermopile is configured to be oriented at an angle between 30 and 70 degrees normal to the surface, preferably between 30 and 60 degrees normal to the surface.

8. The sensor device according to claim 1, wherein the output signal configured to control the electrical device to turn on, or to turn off.

9. The sensor device according to claim 1, wherein the electrical device is at least one lighting device, and wherein the output signal is configured to control a lighting property of said at least one lighting device;
  wherein the lighting property is at least one of: an intensity, a color, a color temperature, a modulation, a directionality, a light recipe and/or a light scene.

10. A system comprising the sensor device according to claim 1 and at least one electrical device;
  wherein the output signal of the sensor device is configured to control the at least one electrical device upon determining the movement characteristic.

11. The system according to claim 10, wherein the system is a lighting system and/or the at least one electrical device is at least one lighting device.

12. The system according to claim 10, wherein the at least one electrical device is a blocking device, the blocking device being one of: a door, a gate, a window, a vault, or a tourniquet;
  wherein the output signal is configured to control the blocking device to open or close.

13. The system according to claim 10, wherein the at least one electrical device is a sensor.

14. A method of determining a movement direction of a person moving across a surface, wherein the method is performed by a sensor device comprising a Single Pixel Thermopile adapted to be oriented relative to a surface and a controller, wherein the method comprises:
  the Single Pixel Thermopile monitoring a detection region and measuring over time a temperature signal of said detection area;
  wherein the detection region is bounded by the surface and the Single Pixel Thermopile is configured to be oriented at an angle of at least 20 degrees normal to the surface;
  wherein a projection of the detection region onto the surface renders an elongated detection area with a length axis and a width axis;
  the controller obtaining the temperature signal of the detection region;
  the controller detecting an asymmetric pattern in the temperature signal of the detection region;
  the controller determining a movement direction of the person moving across the surface by detecting the asymmetric pattern in the temperature signal of the detection region;
  wherein the asymmetric pattern comprises an initial slope leading towards a peak and a subsequent slope leading away from the peak, wherein the initial slope and the subsequent slope are asymmetric;
  the controller outputting an output signal configured to control an electrical device upon determining the movement direction.

* * * * *